(12) United States Patent
MacDonald et al.

(10) Patent No.: US 12,078,504 B2
(45) Date of Patent: Sep. 3, 2024

(54) LOADING DOCK ALIGNMENT SYSTEM

(71) Applicant: Sam Carbis Asset Management, LLC, Florence, SC (US)

(72) Inventors: Ellie H. MacDonald, Timmonsville, SC (US); Michael Urban, III, Blacksburg, VA (US); Shawn C. Mizell, Florence, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 201 days.

(21) Appl. No.: 17/501,132

(22) Filed: Oct. 14, 2021

(65) Prior Publication Data

US 2022/0113157 A1    Apr. 14, 2022

Related U.S. Application Data

(60) Provisional application No. 63/094,526, filed on Oct. 21, 2020, provisional application No. 63/091,549, filed on Oct. 14, 2020.

(51) Int. Cl.
| | |
|---|---|
| *G01C 21/36* | (2006.01) |
| *B65G 69/00* | (2006.01) |
| *H04N 5/272* | (2006.01) |
| *H04N 7/18* | (2006.01) |

(52) U.S. Cl.
CPC ....... *G01C 21/3658* (2013.01); *B65G 69/006* (2013.01); *H04N 5/272* (2013.01); *H04N 7/183* (2013.01)

(58) Field of Classification Search
CPC .. G01C 21/3658; B65G 69/006; H04N 5/272; H04N 7/183
See application file for complete search history.

(56) References Cited

U.S. PATENT DOCUMENTS

| | | | |
|---|---|---|---|
| 6,661,516 B1 * | 12/2003 | Dietsch | B60S 3/002 356/399 |
| 7,216,741 B2 | 5/2007 | MacDonald et al. | |
| 8,015,647 B2 | 9/2011 | Bennett | |
| 8,403,109 B2 | 3/2013 | Bennett | |
| 8,985,274 B2 | 3/2015 | Sun et al. | |
| 9,505,568 B1 | 11/2016 | Parris et al. | |
| 10,800,618 B1 * | 10/2020 | Faulkner | B65G 69/006 |
| 2008/0180526 A1 * | 7/2008 | Trevino | B60D 1/36 348/E7.086 |
| 2016/0009177 A1 * | 1/2016 | Brooks | B60K 35/00 340/468 |
| 2020/0013285 A1 * | 1/2020 | Wang | B60P 3/22 |

* cited by examiner

*Primary Examiner* — Aaron L Troost
(74) *Attorney, Agent, or Firm* — Dority & Manning, P.A.

(57) ABSTRACT

A system for guiding a driver of a tractor trailer truck entering a loading bay includes a display screen disposed on the driver side of the loading bay and angled to remain in continuous uninterrupted view of the driver as the truck is entering the loading bay. A front sensor is disposed to a first side of the loading bay, and a rear sensor spaced apart from the front sensor is disposed along the same side of the loading bay. A controller is connected electrically to the front sensor, the rear sensor, and the display screen. A camera has a field of view aimed between the front sensor and the rear sensor where the loading hatch of the transport tank will be disposed when the transport tank is aligned in the loading bay for taking on cargo.

11 Claims, 14 Drawing Sheets

TRUCK ALIGNMENT SYSTEM SCHEMATIC

US 12,078,504 B2

LOADING DOCK ALIGNMENT SYSTEM

CROSS-REFERENCE TO RELATED APPLICATIONS

This application claims priority to application Ser. No. 63/091,549 filed Oct. 14, 2020, which is hereby incorporated herein by this reference for all purposes. This application claims priority to application Ser. No. 63/094,526 filed Oct. 21, 2020, which is hereby incorporated herein by this reference for all purposes.

STATEMENT REGARDING FEDERALLY SPONSORED RESEARCH OR DEVELOPMENT

Not applicable.

FIELD OF THE INVENTION

The subject matter disclosed herein generally involves a system for ensuring proper alignment of bulk transport vehicles with respect to loading platforms and their worker fall protection apparatus.

BACKGROUND OF THE INVENTION

U.S. Pat. No. 8,985,274 to Sun et al, which is hereby incorporated herein in its entirety by this reference for all purposes, discloses moveable loading platforms that surround both sides of a flatbed transport vehicle that is to be loaded or unloaded.

Bulk material, whether liquid or granular, is loaded into or unloaded or out of closed vessels carried on transport vehicles such as trucks or rail cars. FIG. 2 of U.S. Pat. No. 9,505,568, which is hereby incorporated herein in its entirety by this reference for all purposes, shows an example of a loading arm for pumping bulk material through the open hatch in the top of the tank, which in this case is carried on a rail car. The loading stations are equipped with apparatus for flowing the material into the vessels through a loading hatch in the top of the vessel. The surface that surrounds the loading hatch on the top of the vessel can become a slippery surface, yet the loading process requires workers to walk around the loading hatch on that surface. Accordingly, the loading stations are equipped with apparatus for surrounding the loading hatch with worker fall protection devices. FIG. 2 of U.S. Pat. No. 8,015,647, which is hereby incorporated herein in its entirety by this reference for all purposes, shows an example of a worker protection cage in the deployed orientation at the top of the tank. FIG. 2 of U.S. Pat. No. 7,216,741, which is hereby incorporated herein in its entirety by this reference for all purposes, shows a view looking down on the top of the tank with a gangway having one end connected to the loading platform disposed above and to one side of the tank, and another version of the worker protection cage connected to the opposite end of the gangway.

However, proper functioning of the flowing apparatus and the fall protection devices requires accurate disposition of the transport vehicle with respect to the flowing apparatus and the fall protection devices. Conventionally, disposition of a transport vehicle in the loading bay depended on the sight and distance judgment of the vehicle's driver when the vehicle is driven next to the loading bay. Often a red line was painted on the ground to assist the driver when driving the vehicle into the loading bay. However, different transport vehicles and different drivers made for many erroneous dispositions of the vehicle.

If the incorrect disposition of the vehicle was not corrected, then the flowing apparatus and/or the fall protection apparatus would not function as intended. The consequences of malfunction could vary from undue time spent during the loading process to worker injury during the loading process. However, backing the transport vehicle out of the loading bay to re-approach the loading bay a second time involves lost time and doesn't guarantee any better positioning of the transport vehicle. Thus, correcting these misalignments of the vehicle wasted the driver's time and the time of those workers waiting to load or unload the vehicle's contents. Failing to correct these misalignments could lead to mishaps involving damage to the vehicle, its contents or to personnel attending the vehicle.

Thus, a solution to this problem of accurate positioning of bulk transport vehicles in a loading bay of a loading dock for bulk material is long overdue.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

Figure 1:
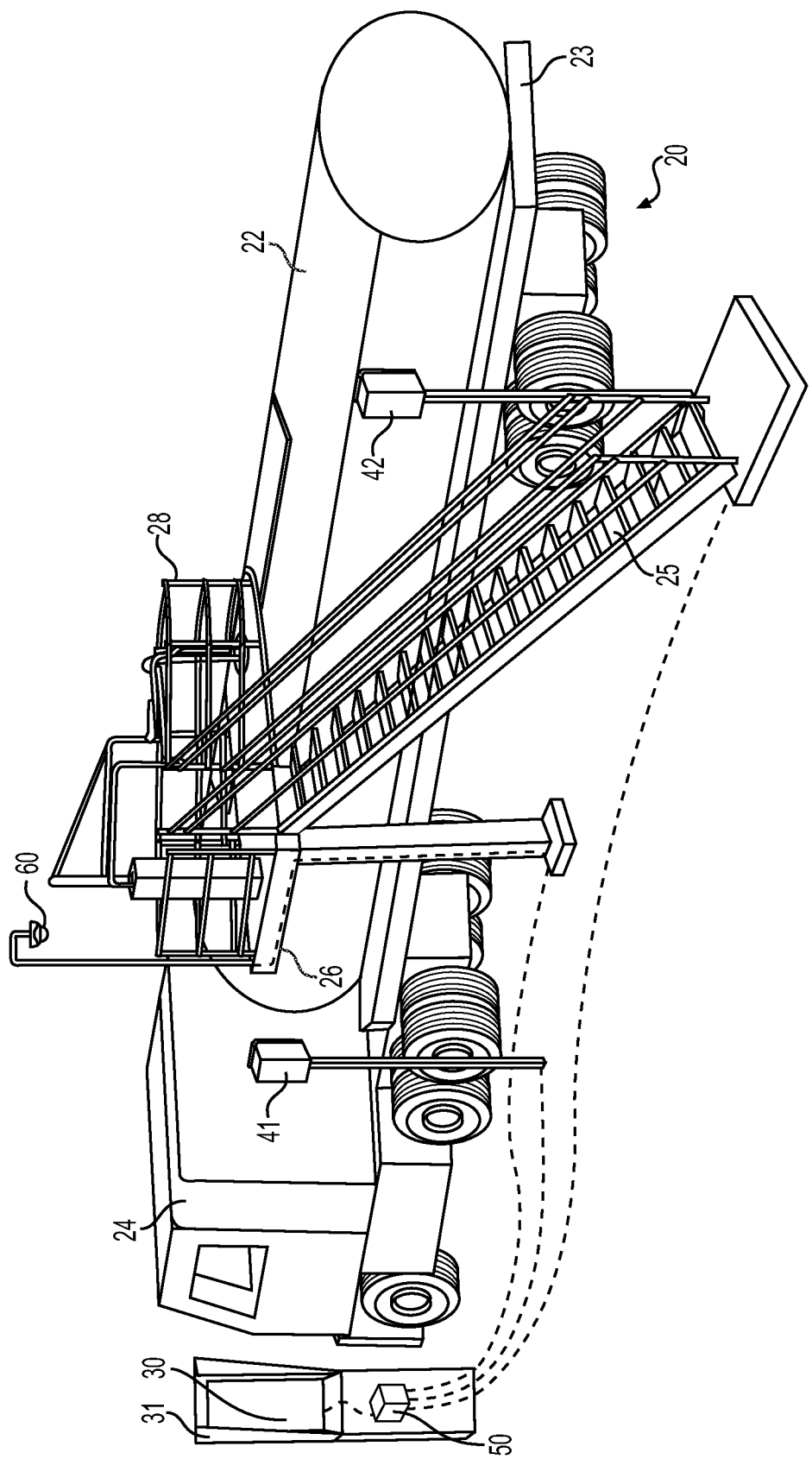
FIG. 1 is an elevated perspective view of a presently preferred embodiment of a system for guiding a driver of a tractor trailer truck entering a loading bay for proper alignment of the hatch in the top of a tank carried on the trailer.

The accompanying drawings, which are incorporated in and constitute a part of this specification, illustrate at least one presently preferred embodiment of the invention as well as features applicable to some alternative embodiments. These drawings, together with the written description, explain the principles of the invention but by no means are intended to be exhaustive of every possible embodiment of the invention.

DETAILED DESCRIPTION OF EXEMPLARY EMBODIMENTS OF THE INVENTION

Reference now will be made in detail to present exemplary embodiments of the invention, wherein one or more examples of which are illustrated in the accompanying drawings. The detailed description uses numerical and/or letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 1200 also includes all possible sub-ranges, examples of which are from 100 to 150, 170 to 190, 153 to 162, 145.3 to 149.6, and 187 to 1200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

FIG. 1 is an elevated perspective view of a system for guiding a driver of a tractor trailer truck entering a loading bay 20 for proper alignment of the hatch in the top of a transport tank 22 carried on the trailer 23.

Figure 4:
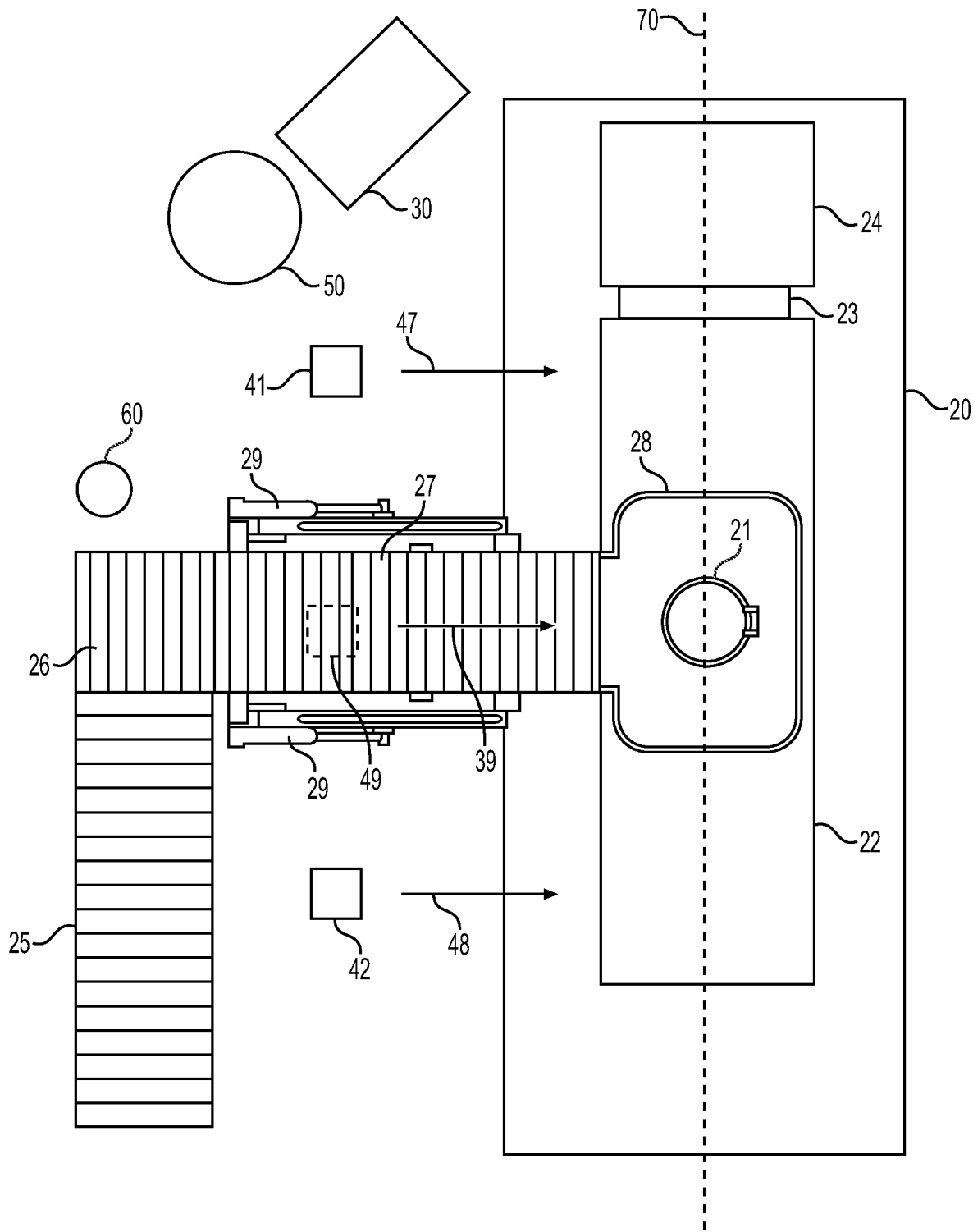
FIG. 4 is a schematic representation taken from above of the embodiment of the system shown in FIG. 1.
Figure 15:
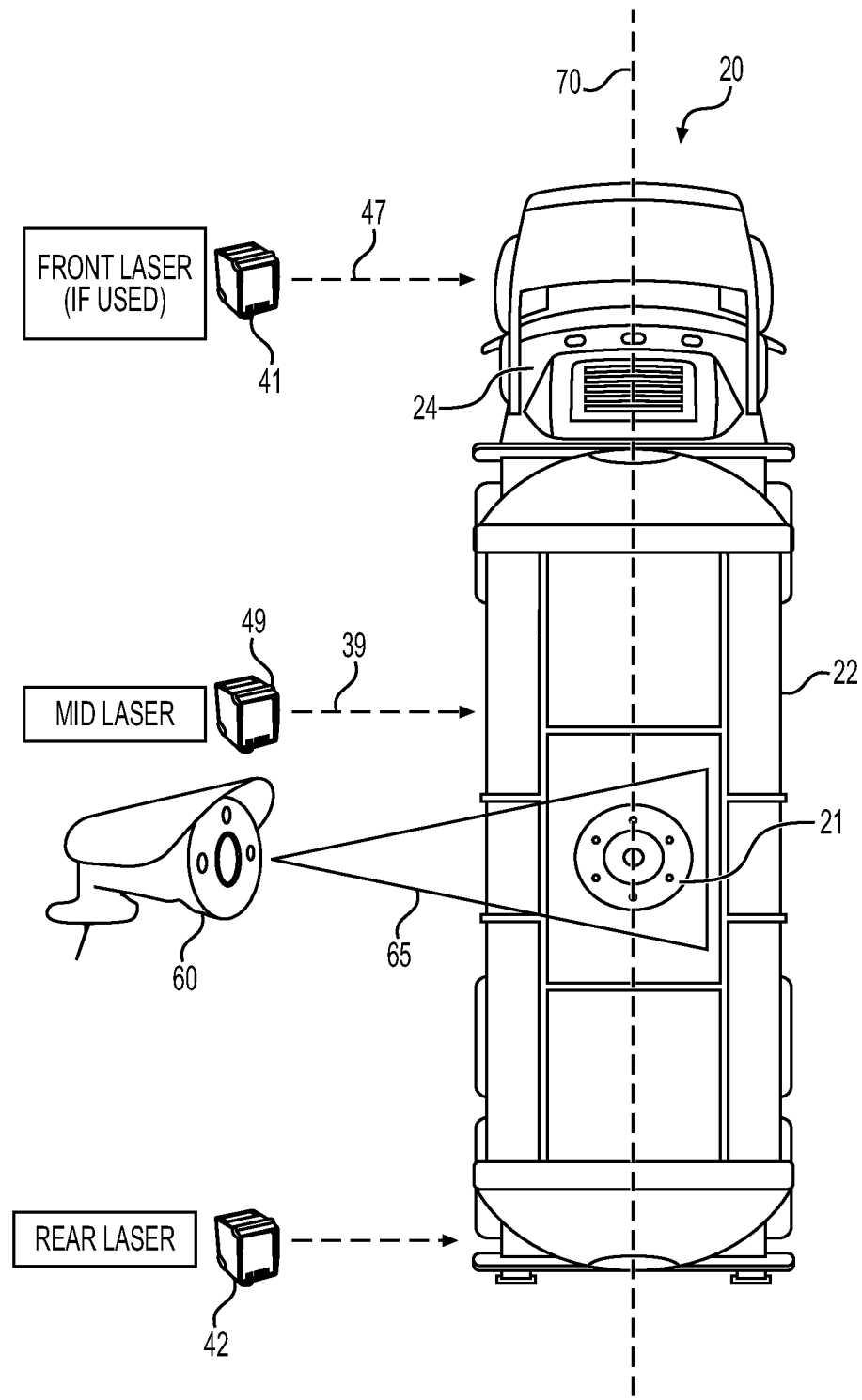
FIG. 15 is a schematic representation taken from above of the embodiment of the system shown in FIG. 1.

FIG. 4 presents a schematic diagram of system components in a view from above the system. The various components are shown in FIG. 4 in relation to a typical loading bay 20, which has a footprint indicated by the rectangle designated 20. As shown schematically in FIGS. 4 and 15, the loading bay 20 stretches from front to rear along a generally straight longitudinal axis 70, and the components of the embodiment of the system of the present invention are arrayed generally along this axis 70. A loading hatch 21 is located in the top of a transport tank 22 carried on a trailer 23 that is connected to a truck cab 24. Each of FIGS. 4 and 15 schematically shows a transport tank 22 that is properly aligned for the operation of loading material into the tank 22 through the opening beneath the hatch 21, which is shown in a closed disposition.

As shown schematically in FIGS. 1 and 4, an exemplary embodiment of the system of the present invention includes a display screen 30 disposed on the driver side of the loading bay 20 and angled toward the loading bay 20 so that the display screen 30 remains in continuous uninterrupted view of the driver as the truck is entering the loading bay 20.

As is conventional, the loading bay 20 is provided with a stairway 25 from the roadway ground level to an elevated platform 26. A gangway 27 has one end pivotally connected to the side of the platform 26 facing the loading bay 20, which will receive the transport tank 22 that is to be loaded with material. The workers that are tasked with opening the hatch 21 can ascend the stairway 25 to the platform 26 and lower a gangway 27 to the top of the transport tank 22. The lowering of the gangway 27 can be accomplished with the aid of actuators 29, which can be counterweight balanced for manual deployment and/or powered hydraulically, pneumatically or by electrically driven motors. From the end of the gangway 27 opposite the end that is pivotally connected to the platform 26, the workers can lower a fall protection cage 28. The deployment of the fall protection cage 28 can be accomplished with the aid of actuators 29, which can be counterweight balanced for manual deployment and/or powered hydraulically, pneumatically or by electrically driven motors. When the transport tank 22 is properly positioned in the loading bay 20, then the fall protection cage 28 desirably will be positioned properly around the hatch 21 so as to effectuate a desired degree of fall protection for the workers who perform tasks around the hatch 21 on the top of the transport tank 22.

Figure 3:
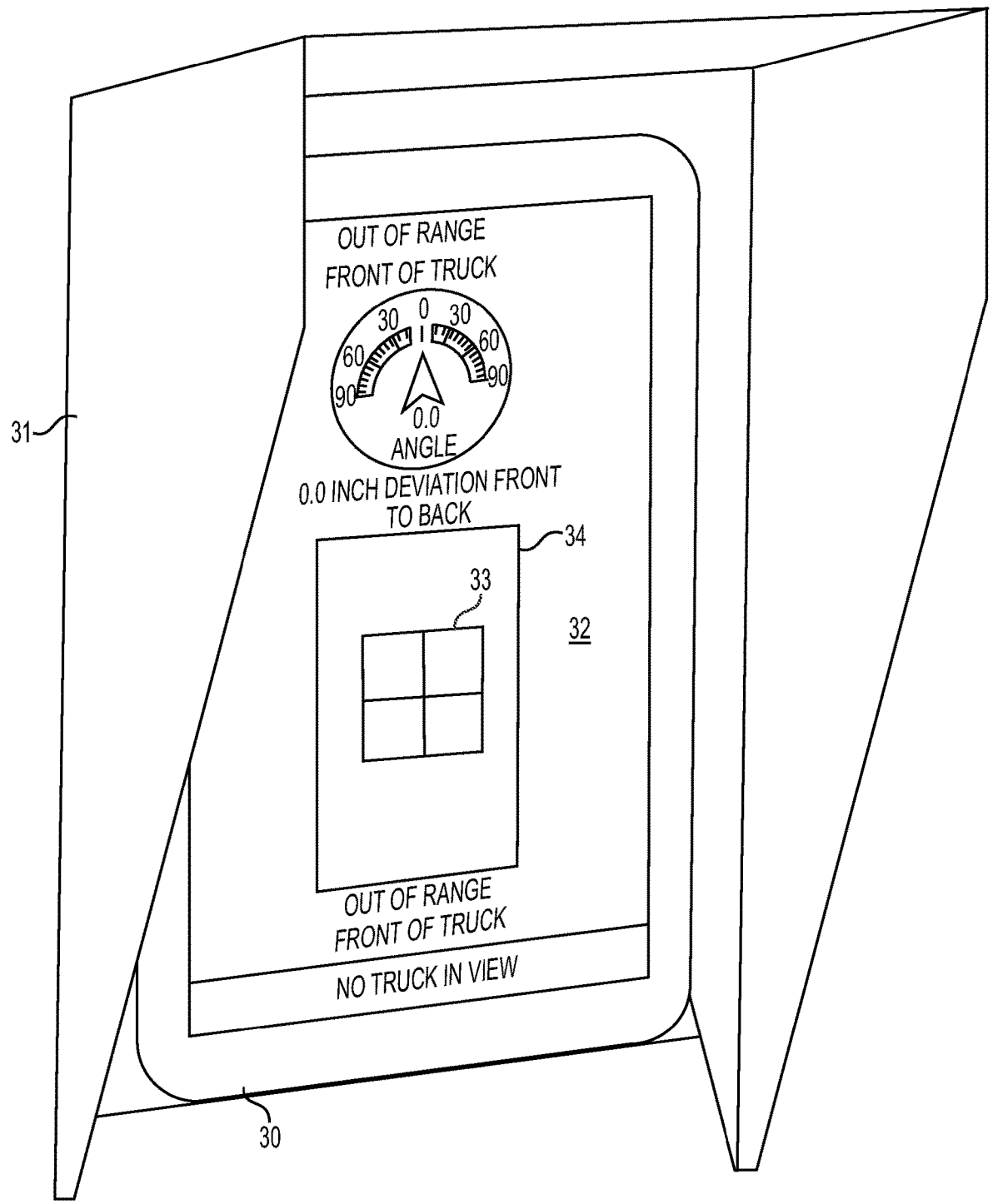
FIG. 3 is an elevated perspective view of the component of FIG. 2 in another mode of operation.

As shown in FIG. 1, the display screen 30 is positioned at the front of the loading bay 20 and oriented toward the truck's cab 24 at a height where the display screen 30 is visible to the driver in the cab 24 as the truck is being driven into the loading bay 20. As shown in FIGS. 1 and 3, a sunshield 31 is attached around the perimeter of the display screen 30 and is configured and disposed to provide the truck driver with better viewing of the display screen 30 in direct sunlight. The sunshield 31 also serves to shade the display screen 30 and avoid undue heating of the display screen 30 from direct exposure to the sun's rays. A sunshield 31 formed of stainless steel is desirable so as to resist damage from its exposure to outdoor weather conditions.

Figure 8:
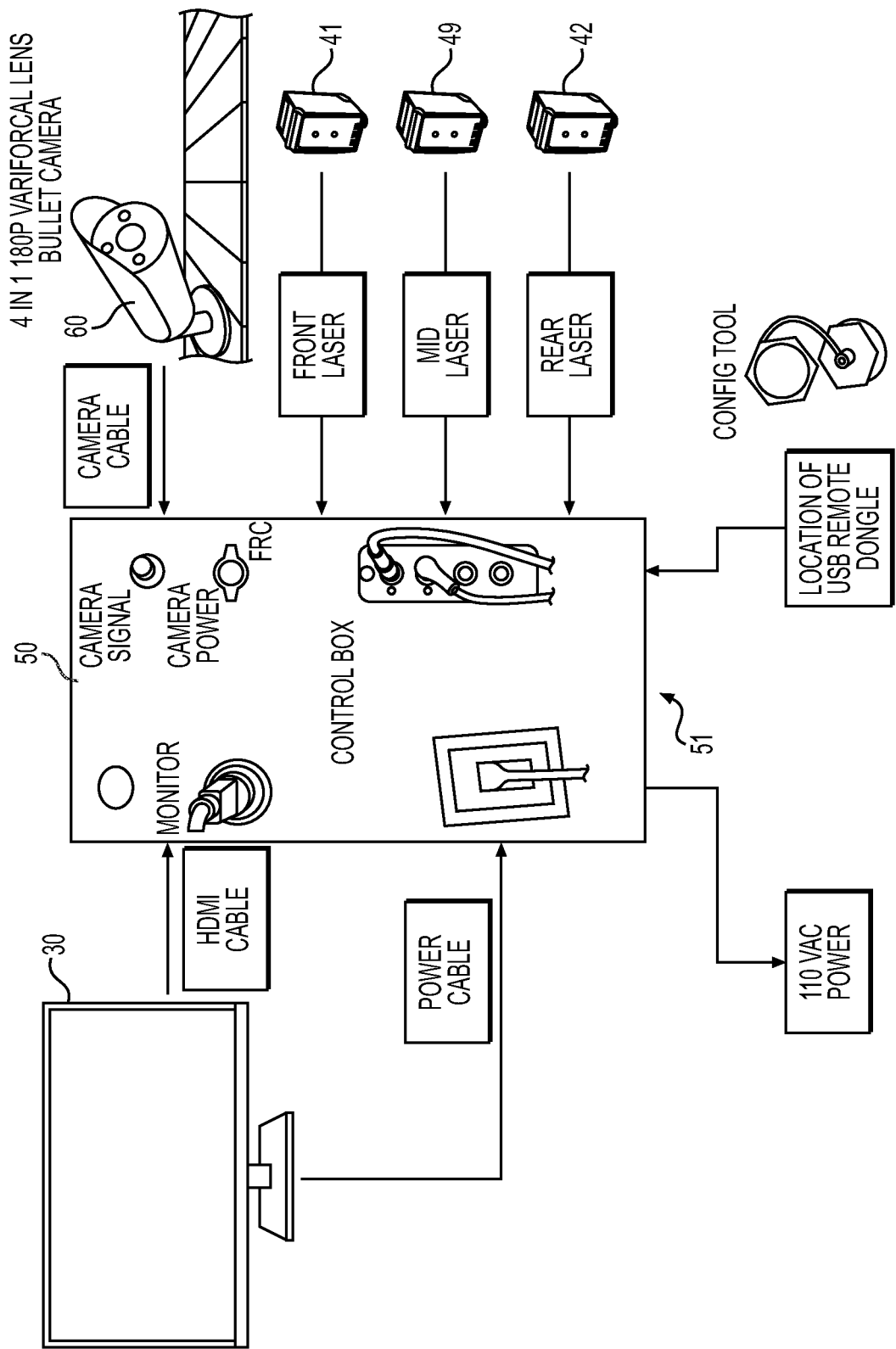
FIG. 8 is a schematic representation of connections between components of the embodiment of the system shown in FIG. 1.
Figure 12:
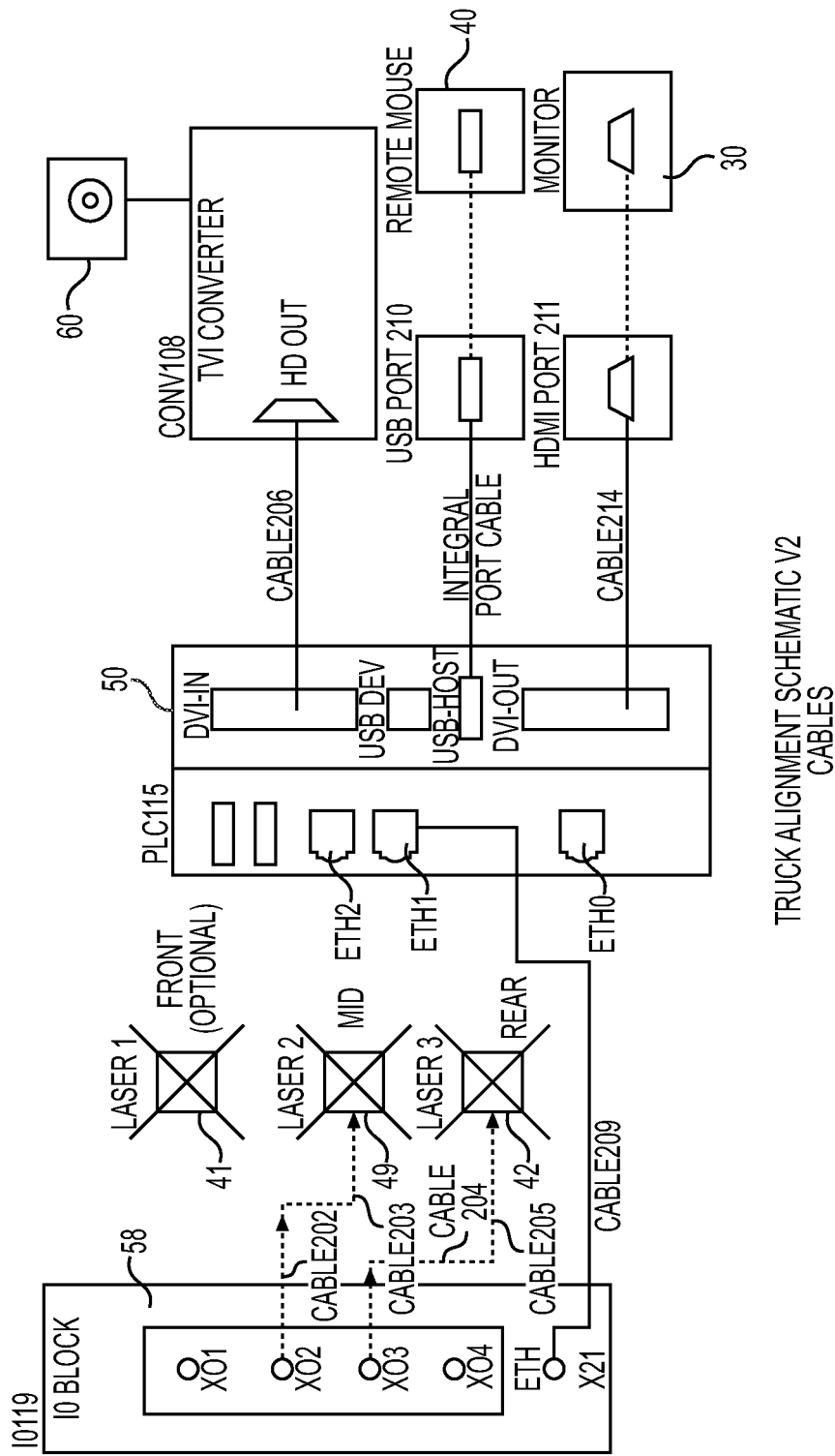
FIG. 12 is a schematic representation of an embodiment of components of the embodiment of the system shown in FIG. 1 with electrical connections.

As schematically shown in FIGS. 1, 8 and 12, the display screen 30 of the system desirably is provided by a flat screen monitor on which can be displayed a graphical user interface (GUI) via an HDMI cable. A wide variety of such monitors are available from well-known suppliers like Dell, Samsung, HP, Acer, Viewsonic and the like. Thus, the ability to employ standard monitors provides flexibility as to both cost and configuration. As shown schematically in FIGS. 2 and 3, the HMI of the system includes the graphical user interface (GUI) that is projected onto the viewing screen 32 of the display screen 30.

As shown schematically in FIGS. 1, 4, 7, 8, 11 and 12, an exemplary embodiment of the system of the present invention includes a controller 50. The controller 50 desirably includes a microprocessor programmed with an algorithm that provides the Human Machine Interface (HMI) that is projected onto the display screen 30. In the embodiment disclosed herein, the computer code defining the processing functions described herein is stored in a memory of the controller 50 and associated with a central processing unit of the controller 50. This computer code, which instructs the performance of the arithmetical calculations and display functions employed by the system to create the displays on the viewing screen 32, is desirably written in JAVA Script and uploaded into the memory of the controller 50.

As shown schematically in FIG. 1, a desirable embodiment of a controller 50 of the system desirably is housed in an enclosure 51 such as a control box schematically shown in FIGS. 8 and 12. The enclosure 51 desirably is a polycarbonate enclosure, which is weatherproof and vented. The controller 50 desirably is mounted within five meters of the display screen 30 and desirably beneath the display screen 30 as schematically shown in FIG. 1. The enclosure 51 schematically shown in FIGS. 1, 4 and 8 desirably is provided with waterproof connectors and a weatherproof cover that can be opened to permit access to the enclosure's interior space where components of the controller 50 are mounted and connected.

As shown schematically in FIGS. 4, 7, 8, 12 and 15, an exemplary embodiment of the system of the present invention includes a middle sensor 49 disposed to a first side of the loading bay 20, which desirably is the driver's side of the loading bay 20. The system includes a rear sensor 42 spaced apart from the middle sensor 49 in the direction of the longitudinal axis 70 and disposed along the same first side of the loading bay 20. As shown in FIGS. 4 and 15, the middle sensor 49 is located so as to detect the presence of the middle of the transport tank 22 when the tractor trailer is properly positioned in the loading bay 20. The middle of the tank 22 is often where the loading hatch 21 will be disposed. Similarly, the rear sensor 42 is located so as to detect the presence of the rear of the transport tank 22 when the tractor trailer is properly positioned in the loading bay 20.

In an alternative embodiment schematically shown in FIGS. 4, 8 and 15, the system also can include a front sensor 41 spaced apart from the middle sensor 49 in the direction of the longitudinal axis 70 and disposed along the same first side of the loading bay 20. The front sensor 41 is located so as to detect the presence of the front of the transport tank 22 when the tractor trailer is properly positioned in the loading bay 20. In configuring the system according to this alternative embodiment to employ three sensors 41, 49 and 42, it becomes possible to achieve better accuracy for determining the alignment of the tank 22 in the loading bay 20. Moreover, any of the two sensors 49, 42 or three sensors 41, 49 and 42 can be disposed on an opposite side of the loading bay 20 from the driver's side.

Figure 5:
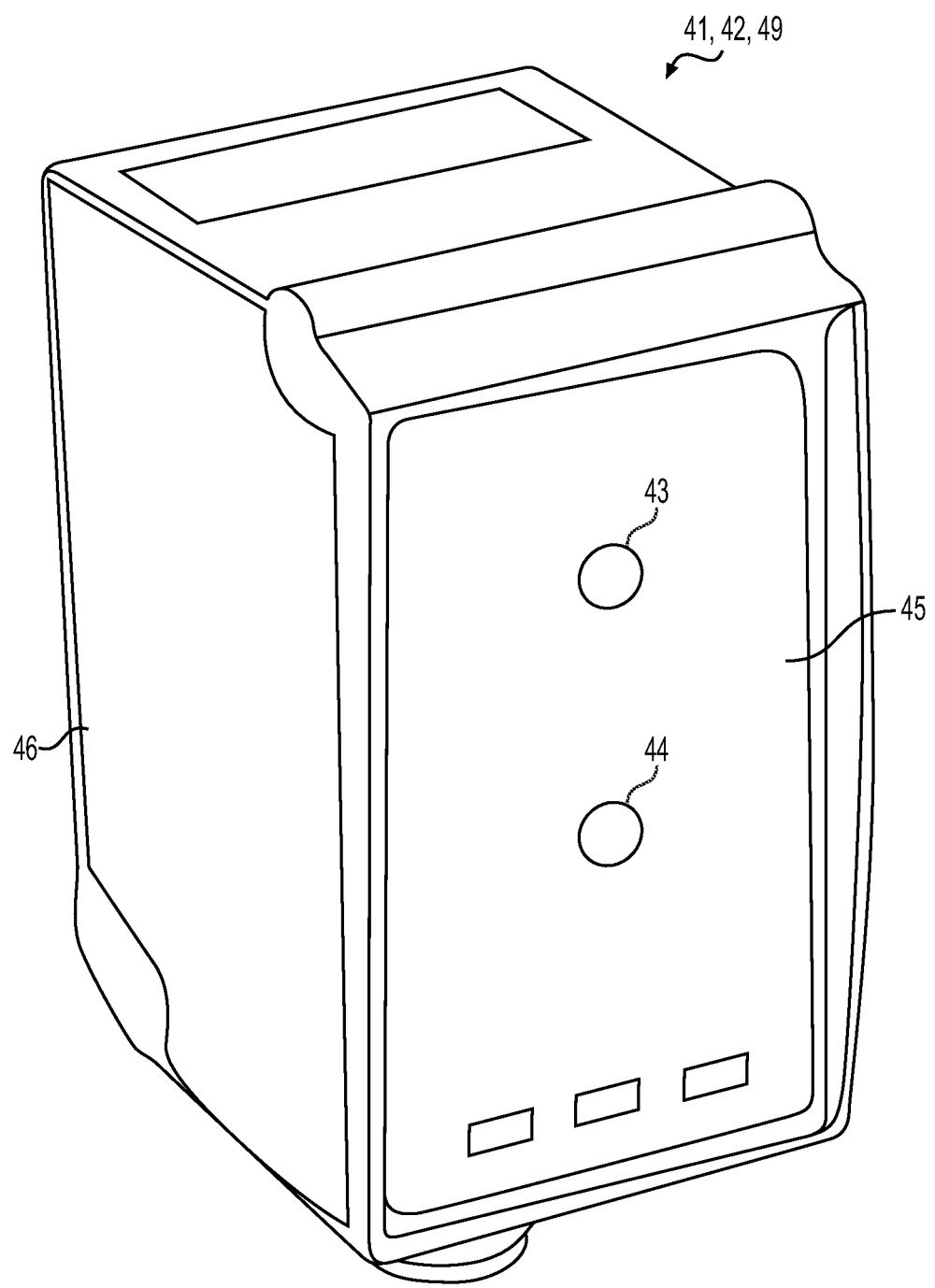
FIG. 5 is an elevated perspective view of a component of the embodiment of the system shown in FIG. 1.

Each of the sensors 41, 42, 49 desirably is a mid-range distance sensor that detects the presence of a solid object. Each of the sensors 41, 42, 49 desirably is a laser measurement sensor that determines the distance from the sensor 41, 42, 49 to the object being detected. As schematically shown in FIG. 5, each sensor 41, 42, 49 desirably includes an emitter situated behind an emitter aperture 43 in the face 45 of the sensor 41, 42, 49. The emitter desirably is a red laser that emits red laser light desirably in a stream of laser pulses through the aperture 43 with a dispersion that measures 15 millimeters by 15 millimeters at a distance of 2 meters from the laser source. Each sensor 41, 42, 49 desirably includes and employs a receiver located behind a receiver aperture 44 in the face 45 of the sensor 41, 42, 49. The two apertures 43, 44 are spaced apart from each other as known in the art. Each of the sensors 41, 42, 49 desirably is enclosed in a housing 46 that resists weather conditions anticipated to be encountered at the site of the loading bay 20. Each of the sensors 41, 42, 49 desirably draws relatively low voltage on the order of 12 to 30 volts. Each of the sensors 41, 42, 49 desirably has a measuring range on the order of 50 millimeters to 12 meters. Each of the sensors 41, 42, 49 desirably has a detection accuracy of plus or minus 10 millimeters.

Each of the sensors 41, 42, 49 desirably provides a digital detection signal of no more than 100 milliamperes at a detection frequency ranging from as fast as once every millisecond to as slow as once every 32 milliseconds. Suitable sensors 41, 42, 49 are available from Sick AG of Waldkirch Germany (sick.com), and a perspective view thereof is schematically depicted in FIG. 5.

Figure 7:
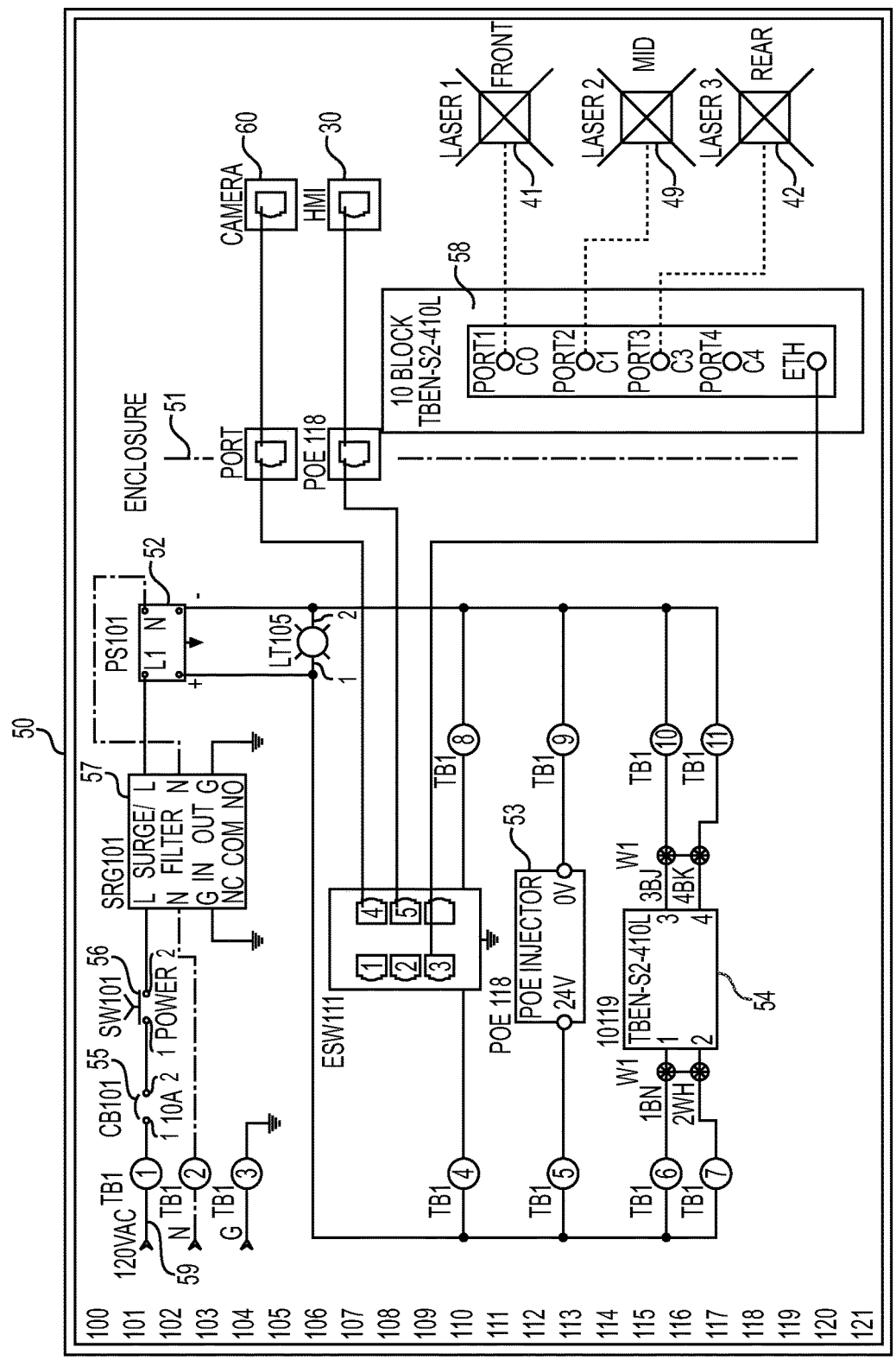
FIG. 7 is a schematic representation of a component of the embodiment of the system shown in FIG. 1 with electrical connections.
Figure 11:
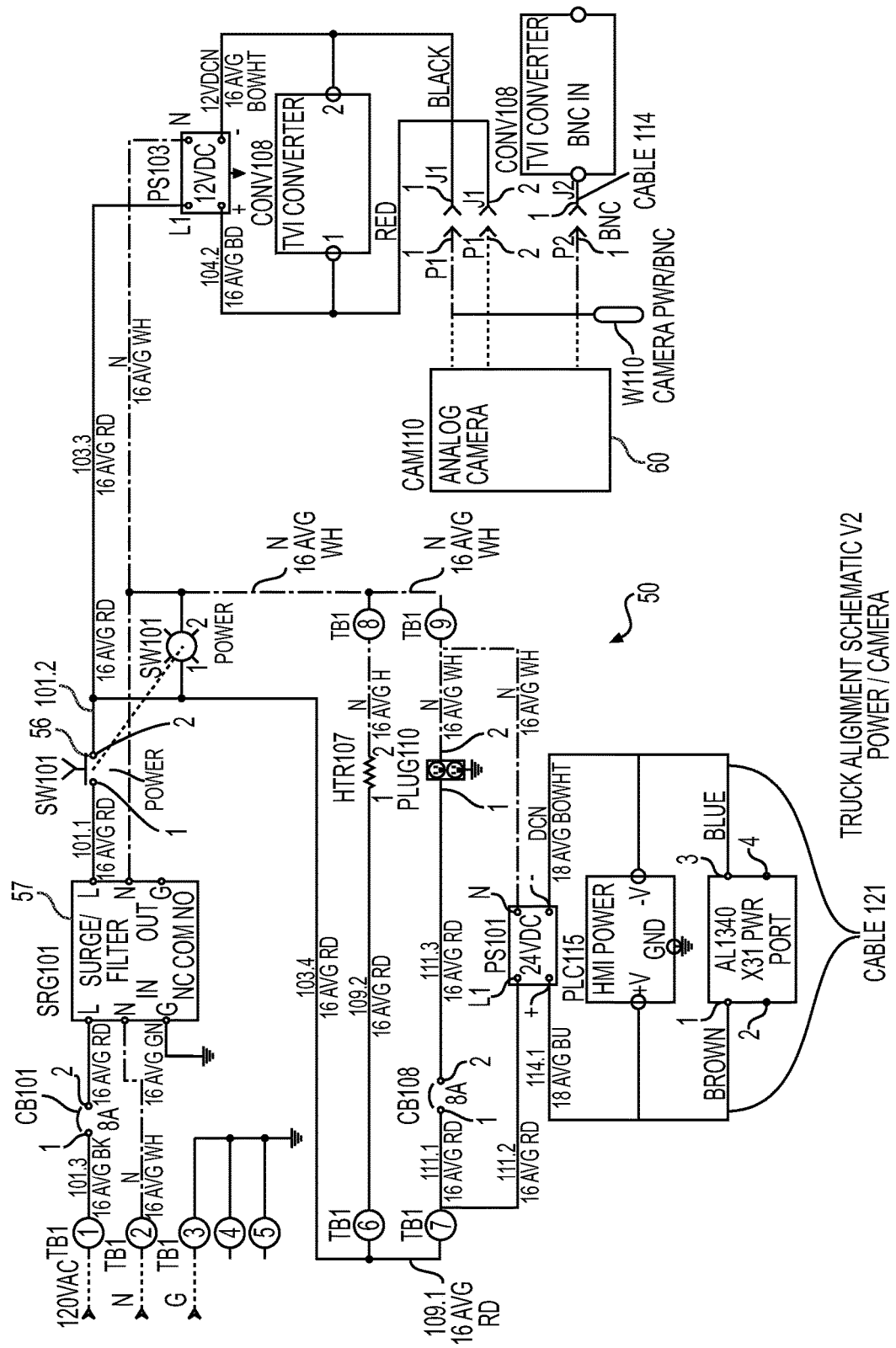
FIG. 11 is a schematic representation of an embodiment of components of the embodiment of the system shown in FIG. 1 with electrical connections.

The emitter of each of the sensors 41, 42, 49 desirably sends a laser pulse of a laser beam that will be reflected off an object in the path of the laser beam, and the reflection will return to the receiver of the sensor 41, 42, 49 and thus be detected as an object that has entered the field of the sensor 41, 42, 49. As an example of this operation, the path of the laser beam emitted from the front sensor 41 is schematically indicated in FIG. 4 by the arrow 47. Similarly, the path of the laser beam emitted from the middle sensor 49 and the rear sensor 42 is schematically indicated in FIG. 4 by the arrows designated 39 and 48 respectively. The sensor's receiver will receive the reflected laser beam that has been reflected off the object that has entered the detection field of the sensor 41, 42, 49 and generate a digital detection signal that is transmitted to the controller 50, which is schematically shown in FIGS. 7, 11 and 12, for further processing to determine the distance between the object and the sensor 41, 42, 49. The microprocessor of the controller 50 desirably is programmed with an algorithm that compares the time lag between the emission of the laser pulse and the generation of the digital detection signal to determined distance between the sensor 41, 42, 49 and the transport tank 22 or the trailer 23, as the case may be.

Figure 6:
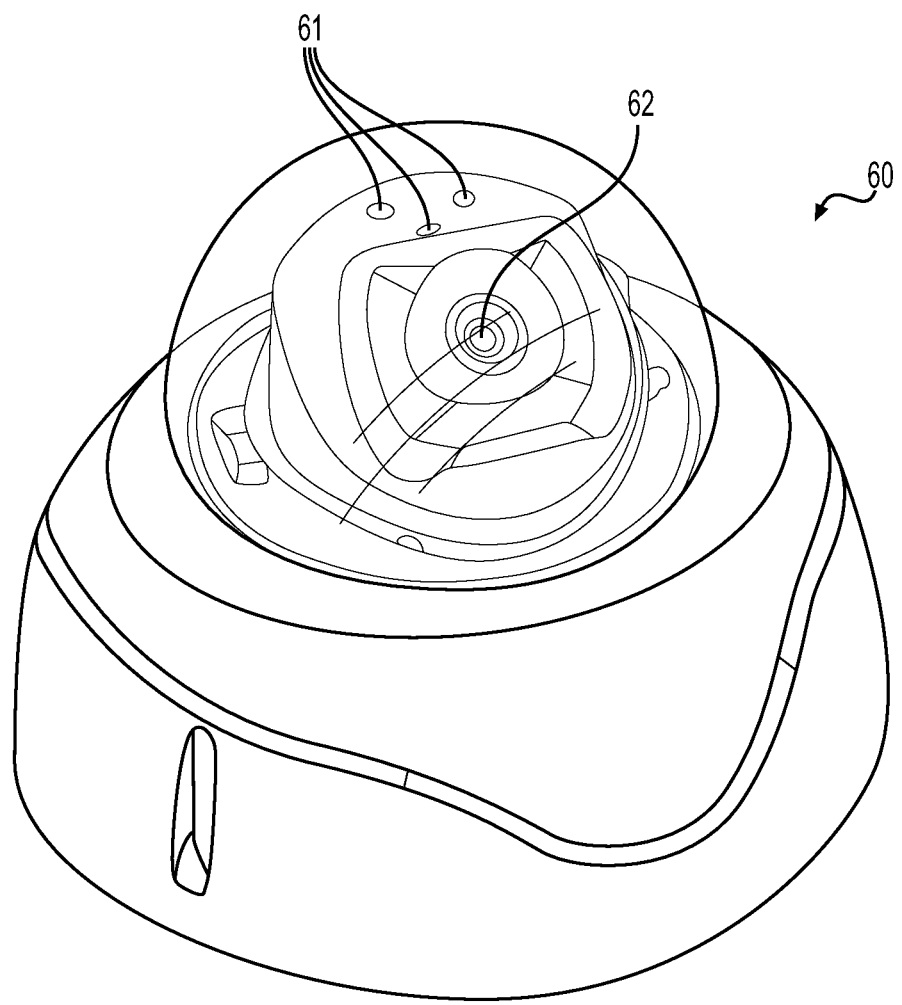
FIG. 6 is an elevated perspective view of a component of the embodiment of the system shown in FIG. 1.

As shown schematically in FIGS. 1, 4, 8, 11, 12 and 15, an exemplary embodiment of the system of the present invention includes a camera 60. A suitable camera 60 is the Model VBT-2812R analog camera available from 101 Audio Video Inc. of 1180 Miraloma Way, Suite E, Sunnyvale, California, and a perspective view thereof is depicted in FIG. 8. As schematically shown in FIG. 6, an alternative embodiment of the camera 60 desirably is a fixed dome network camera with built-in infrared illuminators 61 that are effective up to 30 meters and available from Vivotek, Inc. of California.

As schematically shown in FIG. 15, the camera 60 is configured to have a field of view 65 aimed between the front sensor 41 and the rear sensor 42 and in particular where the loading hatch 21 of the transport tank 22 will be disposed when the tractor trailer truck is properly aligned in the loading bay 20 for taking on cargo. As shown in FIGS. 1, 4 and 15, the camera 60 desirably is mounted offset from where the loading hatch 21 must be located for the loading operation once the tractor trailer is properly positioned in the loading bay 20. As shown schematically by the dashed line in FIG. 1, the camera 60 is electrically connected to the controller 50. As shown schematically by the solid line in FIG. 8, the electrical connection between the camera 60 and the controller 50 is made by connecting one end of a cable into a port carried on the exterior of the enclosure 51 of the controller 50 and the opposite end of the cable into a compatible port of the camera 60. FIG. 11 schematically shows additional detail with respect to controller 50, the display screen 30 and the camera 60. Alternatively, electronic signals can be exchanged by wireless communication between the controller 50 and the camera 60, and the display screen 30.

The camera 60 desirably weighs less than a kilogram and consumes 650 milliamperes with the infrared or 100 milliamperes without the infrared on, from a 12-volt direct current power supply. The camera 60 desirably has a manual lens with a focal length that can be manually varied between 2.8 millimeters and 12 millimeters. The camera 60 desirably includes a 2.1 Megapixel CMOS sensor with 1920 pixels (horizontal) times 1080 pixels (vertical). The resolution of the camera 60 desirably is 1080 pixels at 25 to 30 frames per minute (HD-TVI, HD-AHD, HD-CVI; 1280(H)/1000TVL CVBS. The camera 60 desirably is configured for low light conditions to facilitate employment of the system during loading sessions held at night or overcast daytime conditions. The camera 60 desirably is configured for operation in extremely bright conditions. The camera 60 desirably is enclosed in a housing that resists weather conditions anticipated to be encountered at the site of the loading bay 20. The housing of the camera 60 desirably is reinforced to withstand vandalism that otherwise would damage the camera 60 or permit its removal from the housing.

The controller 50 is connected electrically to the display screen 30, the middle sensor 49, the rear sensor 42, and the camera 60. FIG. 8 schematically represents connections between components of the embodiment of the system shown in FIG. 1. In the alternative embodiment, the front sensor 41 is likewise electrically connected to the controller 50. These electrical connections desirably are made by cables between the controller 50 and the display screen 30, the front sensor 41, the middle sensor 49, the rear sensor 42, and the camera 60. FIG. 1 schematically represents these electrical cables by the dashed lines. However, the cable between the controller 50 and the middle sensor 49 has been omitted in FIG. 1 to avoid unduly cluttering the drawing. Alternatively, electronic signals can be exchanged by wireless communication between the controller 50 and the front sensor 41, the rear sensor 42, and the display screen 30.

The system also desirably includes various cables, including POE cable, which is connecting the controller 50 to the sensors 41, 42, the camera 60 and the display screen 30. Each of the cables connecting each sensor 41, 42 to the controller 50 desirably has an angled connector on one end that is screwed to the sensor 41, 42 and a straight connector on the other end that is screwed to an input/output block 58 on the outside of the enclosure 51 of the controller 50. These connectors are watertight once they become screwed tight.

Figure 13:
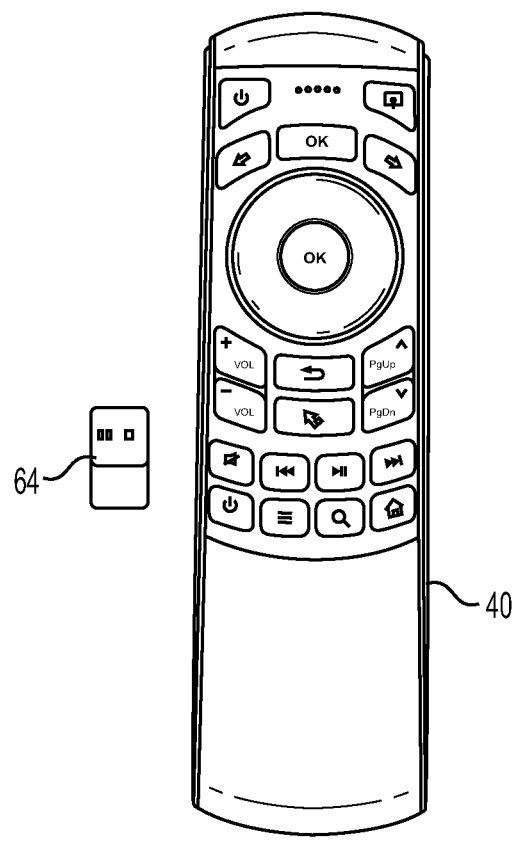
FIG. 13 is a schematic representation of a front side of an embodiment of a component of the embodiment of the system shown in FIG. 1.

As schematically shown in FIG. 11, the electric service supplies electrical power to the controller 50 via a 120 volt AC line that leads through a surge filter 57. Once the power ON switch 56 schematically shown in FIG. 11 is turned on, then the system becomes wireless-enabled and thus the initial setup of the system can be accomplished with the aid of a smartphone, a smart tablet or by manipulating a remote mouse. An example of a remote mouse is schematically shown in FIGS. 12 and 13 and designated by the numeral 40. As schematically shown in FIG. 8, the enclosure 51 for the controller 50 desirably is provided with a USB dongle 64 (FIG. 13) for connecting the remote mouse 40 to the controller 50.

Once the USB dongle 64 is connected, the remote mouse 40 is turned on by pressing the power switch schematically shown in the upper left-hand corner of the remote mouse 40 depicted in FIG. 13. The remote mouse 40 then can be pointed at the display screen 30, and the OK button is pressed to activate a mouse pointer on the viewing screen 32 of the display screen 30, and this mouse pointer will move around the viewing screen 32 in accordance with the operator's movements of the remote mouse 40. To enter the screens for setup or for troubleshooting, the operator presses and holds the OK button for two seconds on the remote mouse 40 while the mouse pointer is located anywhere on the viewing screen 32 of the display screen 30. The viewing screen then should automatically display the first setup screen, which is the Camera Setup Screen schematically shown in FIG. 9.

Figure 14:
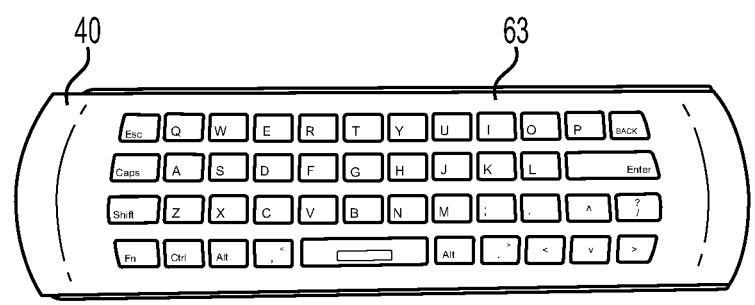
FIG. 14 is a schematic representation of a back side of an embodiment of a component of the embodiment of the system shown in FIG. 1.

Once the camera setup screen has been activated, then the remote mouse 40 allows the operator to move the mouse pointer to hover over the displays of buttons, text boxes, etc. on the viewing screen 32, and selections are made by pressing the OK button on the remote mouse 40. The remote mouse 40 enables the operator to enter numbers from the back side 63 of the remote mouse 40 schematically shown in FIG. 14. The "home" button schematically depicted in the lower right-hand corner of the remote mouse 40 shown in FIG. 13 returns the viewing screen 32 to the display of the main screen. Once the setup or troubleshooting session is completed and the display on the viewing screen 32 has been returned to the main screen, then the operator can remove the USB dongle 64 and turn off the power switch on the remote mouse 40 to conserve the battery life of the remote mouse 40.

Figure 2:
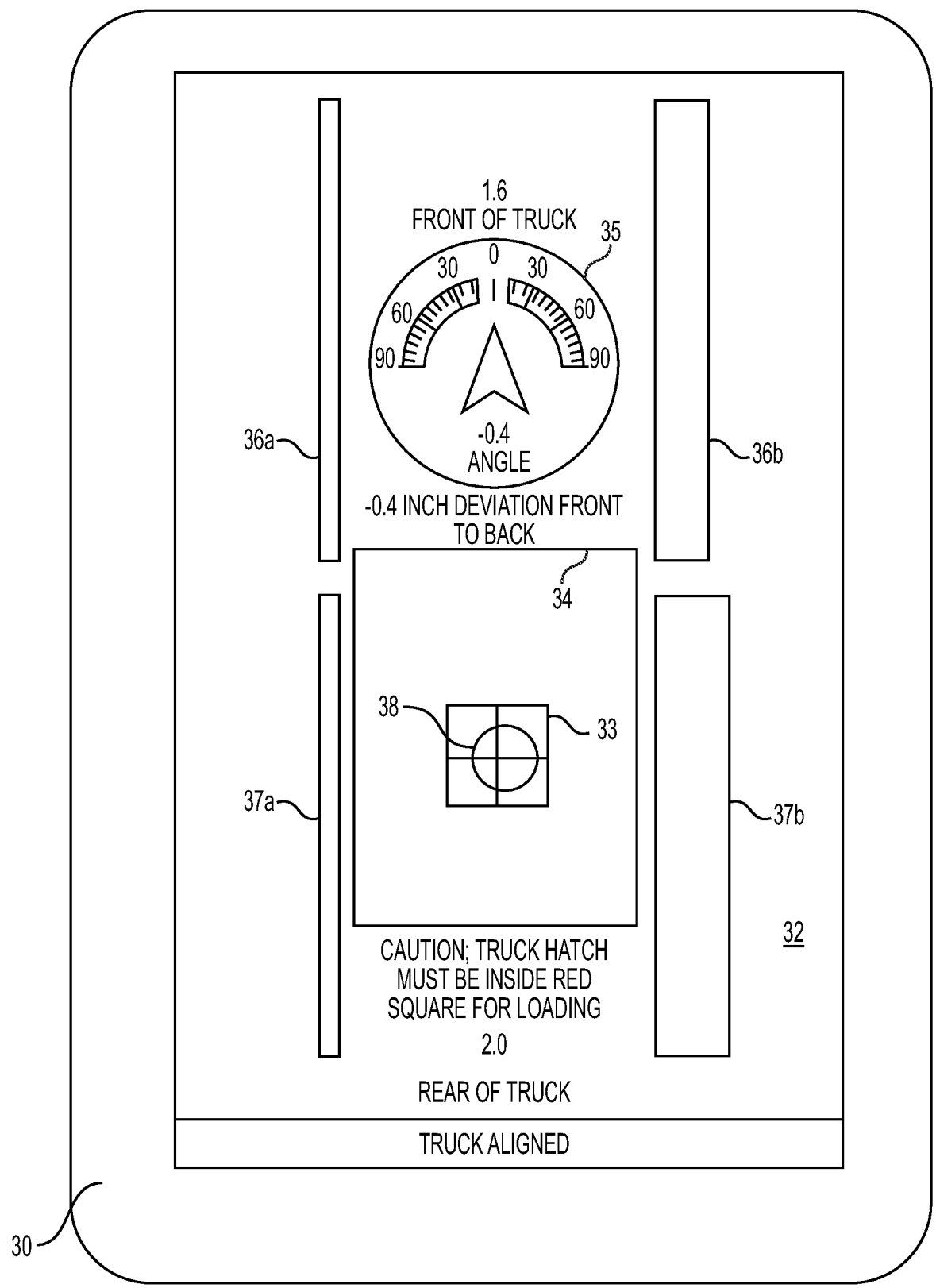
FIG. 2 is a front elevation view of a component of the presently preferred embodiment of the system of the present invention shown in FIG. 1 in one mode of operation.

The display screen 30 is depicted in FIGS. 2 and 3 with different images of the GUI projected in the viewing screen 32 of the display screen 30. FIG. 3 shows the image of the GUI that the driver would see before the tractor trailer begins pulling into the loading bay 20 past the rear sensor 42. FIG. 2 shows the image of the GUI that the driver would see after the tractor trailer has completely entered the loading bay 20 as shown in FIG. 1 past both the front sensor 41 and the rear sensor 42. The images seen in FIGS. 2 and 3 are the so-called main screens of the GUI of the system as opposed to the GUI images that would appear when the operator is performing the initial setup of the system.

As schematically shown in FIGS. 2 and 3, as the driver is pulling the vehicle into the loading bay 20, the main screen of the GUI delivers to the driver in real time, a display that is a combination of representations indicating relative positioning of the front and rear of the transport tank 22 and a live camera stream of video directed at the field of view where the loading hatch 21 is expected to appear when the transport tank 22 is properly situated in the loading bay 20 (FIG. 1). As schematically shown in FIGS. 2 and 3, the bottom of the main screen of the GUI is devoted to the rear of the transport tank 22, which is represented schematically to the driver by the large rectangle 34 in the bottom half of the viewing screen 32. What is being displayed to the driver in the bottom half of the main screen on the viewing screen 32 is informed by the rear sensor 42. The front of the transport tank 22 is indicated to the driver by the large circle gauge 35 in the top half of the viewing screen 32. The gauge 35 is indexed up to 90 degrees to the left and up to 90 degrees to the right of dead center, which is indicated by the zero. What is being displayed to the driver in the top half of the viewing screen 32 is informed by the front sensor 41.

The GUI of the system of the present invention is configured to inform the driver if the vehicle is misaligned, and to show the driver how much the vehicle is misaligned from positioning the hatch 21 of the transport tank 22 where the hatch 21 needs to be positioned in order to allow for ideal location of the protection cage 28 around the open loading hatch 21. As schematically shown in FIG. 2, the GUI includes four colored stripes, with stripes 36a, 37a located to the left of the respective gauge 35 and rectangle 34. The stripes 36b, 37b are located to the right of the respective gauge 35 and rectangle 34. When the system's controller 50 determines that the loading tank 22 is aligned within the desired distance tolerance, then these stripes 36a, 36b, 37a, 37b in the GUI are colored green when displayed to the driver. In this case of proper alignment of the transport tank 22, the respective front sensor 41 or rear sensor 42 measures the distance to the transport tank 22 within the permitted distance tolerance for an alignment determination. That distance tolerance typically is set at about three inches when the system undergoes its initial setup before being put into operation at the loading bay 20. These stripes 36a, 36b, 37a, 37b in the GUI are colored red when displayed to the driver if the front sensor 41 or rear sensor 42 measures the distance to the transport tank 22 beyond the distance tolerance for alignment. Alternatively, to accommodate a driver suffering from color-blindness, these stripes 36a, 36b, 37a, 37b in the GUI can be flashing on and off in rapid succession when displayed to the driver if the front sensor 41 or rear sensor 42 measures the distance to the transport tank 22 beyond the distance tolerance for alignment.

Moreover, the GUI of the system of the present invention is configured to inform the driver how much the vehicle is out of alignment by the relative thickness of the stripes 36a, 36b, 37a, 37b. The thicker the stripe 36a, 36b, 37a, 37b in the GUI shown in the main screen on the viewing screen 32, then the more out of alignment is the front or rear of the transport tank 22 from what is needed to be positioned properly in the loading bay 20. Accordingly in FIG. 2 for example, the image seen by the driver in the main screen displayed on the viewing screen 32 indicates that the front and rear of the transport tank 22 is within the permitted deviation to be in alignment. Thus, each of the stripes 36a, 36b, 37a, 37b in the GUI in FIG. 2 will be displayed in green to the viewer. However, the right side of the front and rear of the transport tank 22 is closer to being out of alignment than is the left side of the front and rear of the transport tank 22. That is why the respective stripes 36a, 37a in the GUI, though displayed in green, on the left side are narrower than the respective stripes 36b, 37b on the right side-. Moreover, the rear of the transport tank 22 is slightly more off center from perfect alignment than is the front of the transport tank 22. That is why the respective stripe 36b of the GUI is narrower than the respective stripe 37b. In the parking job shown in FIG. 2, the image being displayed to the driver indicates that the front of the transport tank 22 deviates by 1.6 inches from perfect alignment, while the rear of the transport tank 22 deviates by 2.0 inches from perfect alignment. However, both of these deviations from perfect alignment are within the permitted 3 inches of deviation. The GUI of the system is configured so that a stripe's maximum thickness, which corresponds to the maximum allowed before the transport tank 22 is deemed to be out of alignment, can be set during the initial setup of the system.

As schematically shown in FIGS. 2 and 3, the main screen shows the camera view with the desired location of the loading hatch 21 when properly aligned indicated in the GUI by the square 33 surrounding the crosshairs. As schematically shown in FIG. 2, the circle 38 schematically represents the image that the camera 60 is live streaming of the loading hatch 21. Thus, the display on the screen 30 provides to the driver a real time view of where the loading hatch 21 is positioned in relation to the desired target positioning indicated by the square 33 for the loading hatch 21. The square 33 provides an icon on the display screen to indicate when the hatch 21 in the top of the tank 22 is situated desirably in the loading bay 20 for deployment of worker safety apparatus such as a fall protection cage 28 with respect to the hatch 21.

During operation of the actual system, the camera 60 will transmit an actual streamed view of the top of the transport tank 22 as the vehicle pulls into the loading bay 20. As schematically shown in FIG. 2, the streamed camera image shows the driver that the loading hatch 21 is within the target area, even if a little to the right to be perfectly positioned with the center point of the loading hatch 21 coincident with the center of the crosshairs. As schematically shown in FIG. 2, when the truck is properly aligned within the allowable tolerances for misalignment, the "TRUCK ALIGNED" message with be displayed on the viewing screen 32 to the driver.

Each of the square 33, the rectangle 34, the gauge 35, the stripes 36a, 36b, 37a, 37b, the circle 38 and the "TRUCK ALIGNED" message is an example of a graphical icon that the system makes visible to the driver on the viewing screen 32 in the course of operation of the system.

The system is configured so that when the main screen view is displayed on the viewing screen 32 of the display screen 30, a remote mouse 40 can be used to make all of the changes. So if multiple touchscreens are in the same loading area with multiple loading bays 20, then the operator can connect the remote mouse 40 to the desired display screen 30 to perform the setup of the system. The SSID for the WIFI for each display screen 30 is always SCXXXX in which XXXX is the last 4 digits of the touchscreen serial number. To connect via a smartphone, the operator can connect to the WIFI shown and use a password provided by the vendor of the system. Once connected to the WIFI, the operator can go to a web browser and type into the address bar, the URL provided by the vendor of the system. A pop-up will ask for user and password—both are provided by the vendor of the system. Once the operator types in the user and password, then the system will direct the operator to a web page to input the parameters needed to set up the system.

Figure 9:
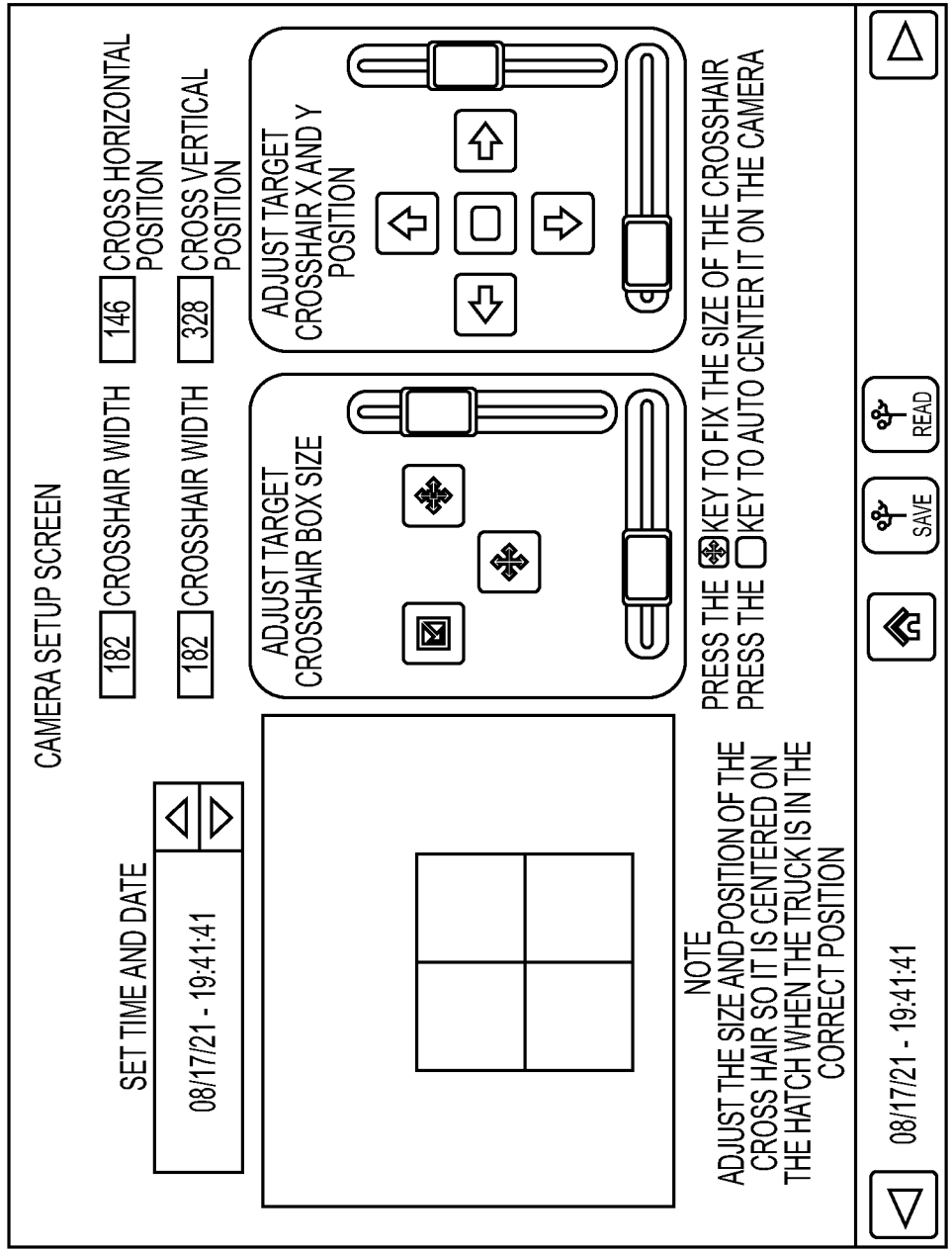
FIG. 9 is a schematic representation of a camera setup screen for the embodiment of the system shown in FIG. 1.

The system is configured so that a camera setup screen view can be displayed on the viewing screen 32 of the display screen 30. A schematic representation of an example of a camera setup screen is shown in FIG. 9. When setting up the system, a trailer needs to be moved into the system and manually aligned so that it is exactly where the transport tank 22 needs to be located for loading operations to be performed as intended. This pre-positioning will aid in providing the inputs needed to set up the system for operation at a particular loading bay 20. The first setup screen is the Camera Setup screen, which would show the camera picture (if the camera 60 is connected) and the cross hair overlay on the camera video feed. The GUI for the camera setup screen view provides buttons below the camera feed being shown on the viewing screen 32. The operator can manipulate these buttons on the touchscreen to set the hatch size and location so that the target field 34 is located directly over the hatch 21. The target field 34 for the hatch 21 also can be manipulated by simply swiping it with the operator's fingers and expanding or contracting the target field 34 with two fingers in a gesture motion. Once the desired size and position of the hatch 21 has been set, then the target field 34 will be re-created on the main screen for drivers to see.

The system is configured so that a web camera setup screen view can be displayed on the viewing screen 32 of the display screen 30. From this web camera setup screen view, the operator can setup the size and position of the crosshatch square 33 over the camera feed 38 shown in FIG. 2 for example. The operator must watch the home screen of the viewing screen 32 while adjusting the hatch size using the buttons on this camera setup screen of the GUI.

Figure 10:
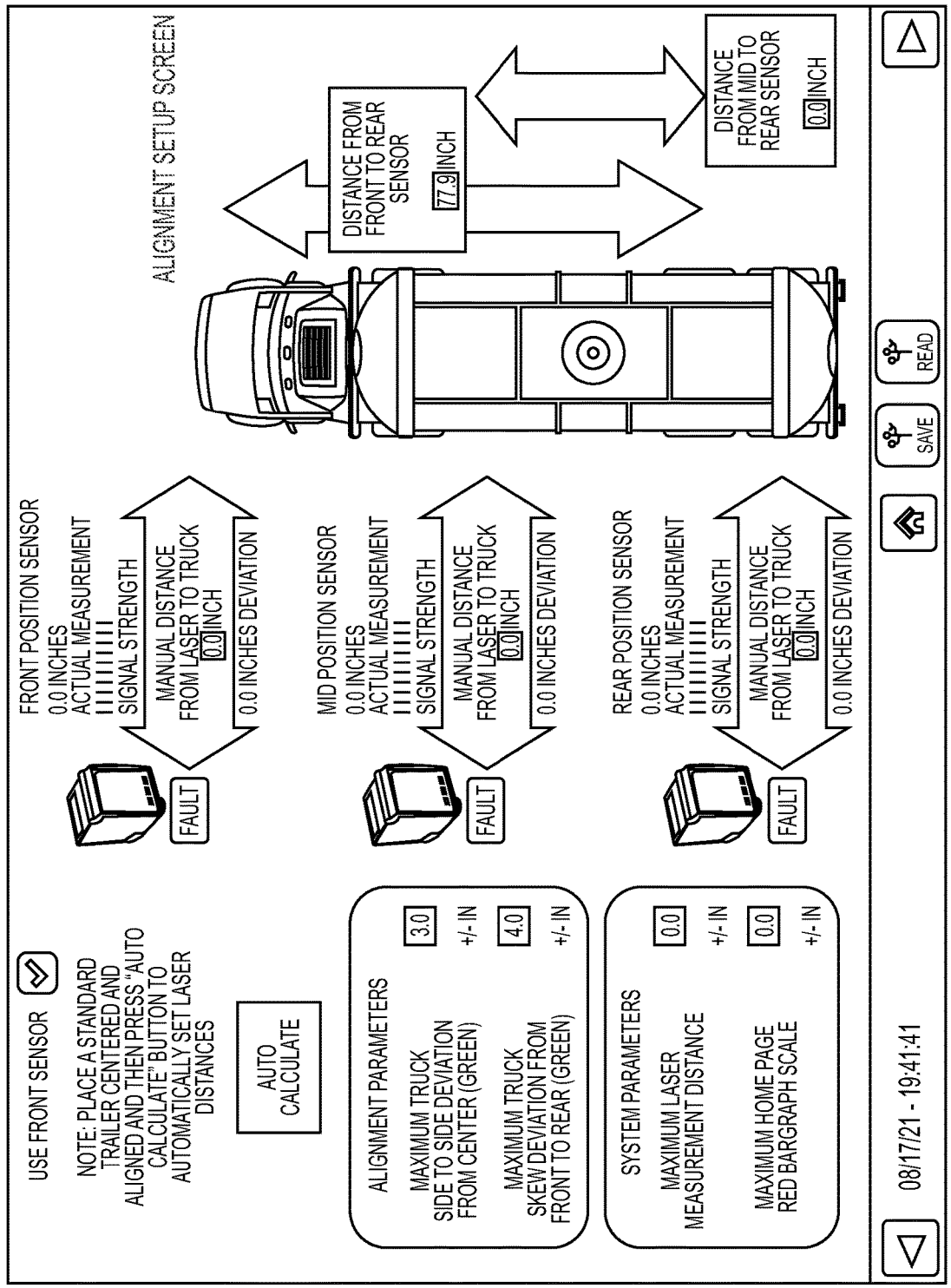
FIG. 10 is a schematic representation of an alignment set up screen for the embodiment of the system shown in FIG. 1.

The system is configured so that an alignment setup screen view can be displayed on the viewing screen 32 of the display screen 30. A schematic representation of an example of an alignment setup screen is shown in FIG. 10. From this alignment setup screen view of the GUI on the touchscreen 30, the operator can set up the laser measuring system to determine the alignment of the transport tank 22. The system is configured so that a web front sensor alignment parameter setup screen view can be displayed on the viewing screen 32 of the display screen 30. From this front sensor alignment parameter setup screen of the GUI on the touchscreen 30, the operator can manually enter a distance from the front sensor 41 to the transport tank 22 if this distance is already known. Moreover, the web front sensor alignment parameter setup screen of the system desirably is configured so that the front sensor 41 can be enabled or disabled from the web front sensor alignment parameter setup screen as well. Similarly, the system is configured so that a web rear sensor alignment parameter setup screen view can be displayed on the viewing screen 32 of the display screen 30. From this web rear sensor alignment parameter setup screen on the touchscreen 30, the operator can manually enter a distance from the rear sensor 42 to the transport tank 22 if that distance is already known.

However, if the transport tank 22 is parked in the exact position required for the system as when the target field 34 for the position of the loading hatch 21 was set up as noted above for the camera setup screen, then the "AUTO CALCULATE" feature of the system desirably enables the controller 50 of the system to determine the appropriate distance parameters for all of the sensors 41, 42, 49. In this instance, the operator merely uses the remote mouse 40 to press the "AUTO CALCULATE" button on the viewing screen 32, and then the controller 50 will use the current distance being measured by each of the sensors 41, 42, 49 to the transport tank 22 for the calculation of the target distance to the transport tank 22. When selected, the middle laser setup and distance between laser setup will be displayed. Middle and rear position sensors 49, 42 show the current measured distance from each respective sensor 49, 42 to the transport tank 22, the sensor reflected light percentage, and if the respective sensor is currently faulted. The actual deviation from the position of the transport tank 22 that is desired for optimum positioning during the loading process also will be displayed on the setup screen schematically shown in FIG. 10.

The distance between the middle sensor 49 and the rear sensor 42 is an important parameter for enabling the algorithm of the system to calculate how skewed is the front-to-back alignment of the transport tank 22 in the loading bay 20. These parameters will be displayed on the alignment setup screen and must be entered manually by the operator, who must measure from the emitter aperture 43 of the middle sensor 49 to the emitter aperture 43 of the rear sensor 41. From this screen on the viewing screen 32, the operator can use the back side 63 of the remote mouse 40 to manually enter the distance in inches from the middle sensor 49 (if used) to the rear sensor 42 and from the front sensor 41 (if used) to the rear sensor 42. These distance measurements are important to enable the system to calculate an accurate skew measurement angle as shown in viewing screen 32 displayed in FIG. 2 for example. Alignment parameters are required to be set to the accuracy that the operator expects from the system. The values for these parameters are entered manually by the operator by pressing the number graphic on this setup screen and entering a value. The system desirably includes the following System Parameters: The Maximum sensor measurement distance is used to show on the main screen of FIG. 3 when a transport tank 22 is not in place in the loading bay 20. For the Maximum sensor measurement distance, the operator typically enters a value a few feet longer than the longest distance from any sensor 41, 42, 49 when a transport tank 22 is in place in the loading bay 20. The Maximum Home Page Red Bargraph scale is the distance in inches when the red block on the main screen of FIG. 3 is at its maximum width.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

In an alternative embodiment shown in FIG. 7, the display screen 30 provides a human machine interface (HMI) and desirably is configured in the form of a projected capacitive multitouch touchscreen having a central processing unit operating on Linux RT with 8 GB of flash, 2 GB of RAM and 64 KB of FRAM. In the alternative embodiment shown in FIG. 7, the display screen 30 desirably comes equipped with a power over ethernet (POE) port, a USB port and an HTML5-compatible browser with a graphic accelerator. A suitable display screen 30 for the alternative embodiment shown in FIG. 7 desirably is provided by a 21 inch (diagonal) rectangular touchscreen available as a JSmart 721 touchscreen from Exor America of Cincinnati, Ohio 45246.

In the alternative embodiment schematically shown in FIG. 7, the controller 50 is included as part of the display screen 30. In this alternative embodiment, the central processing unit of the controller 50 is housed in an enclosure 51 of the display screen 30, but nonetheless configured and dedicated to perform the processing of the signals exchanged with the display screen 30 and the other components (described below) of the system. In this alternative embodiment, the computer code defining the processing functions described herein desirably would be stored in a memory of the controller 50 and associated with the central processing unit of the controller 50 and housed within the enclosure 51.

In an alternative embodiment of the present invention disclosed in FIG. 7, the central processing unit that is housed in the display screen 30, which is described above and that has been chosen for the sake of efficiency, serves the function of the controller 50. FIG. 7 provides a schematic representation of the components housed inside the enclosure 51 of the controller 50 and the electrical connections between them. As shown schematically in FIG. 7, a 120-volt power cable 59 leads out of the enclosure 51 and desirably is about six feet long and can be plugged into a standard 120-volt receptacle for connecting to the public electric service. The controller 50 desirably includes a power supply 52 that converts standard 120-volt alternating current input from the public electric service into an output of 24-volt direct current rated at 5 amperes and 120 watts. The controller 50 desirably includes a POE injector 53 and a 4-port POE ethernet switch 54 rated for 24 volts direct current input and 48 volt output. The controller 50 desirably includes a circuit breaker 55 rated at 6 amperes, a Power ON switch 56, and a surge protector 57. A suitable camera 60 for this alternative embodiment is available from Vivotek, Inc. of California, and a perspective view thereof is depicted in FIG. 6. A single ethernet cable desirably connects the camera 60 to the controller 50.

The alternative embodiment of FIG. 7 with the camera 60 schematically shown in FIG. 6 from Vivotek, Inc. desirably is a POE camera that is a smart camera with its own built-in central processing unit. The camera 60 desirably has a fixed lens 62 with a focal length of 2.8 millimeters. The camera 60 desirably has a field of view with a 103 degree range in the horizontal plane, 76 degrees in the vertical plane and 134 degrees along the diagonal plane. The camera 60 desirably can pan around 350 degrees, tilt over an 80 degree range and rotate over a 180 degree range. The camera 60 desirably is provided with its own digital storage capacity. The camera 60 desirably has video compression capability. The camera 60 desirably has a maximum frame rate of 30 frames per second @ 2560×1920 pixels or 2560×1440 pixels and 60 frames per second @ 1920×1080 pixels. The camera 60 desirably runs on 12 volts of direct current and draws about 8 watts of power.

What is claimed is:

1. A system for guiding a driver of a tractor trailer truck entering a loading bay for proper alignment of the hatch in the top of a tank carried on the trailer, wherein the loading bay elongates along a longitudinal axis, the system comprising:
   a first sensor disposed to a first side of the loading bay;
   a rear sensor spaced apart from the first sensor;
   a camera having a field of view aimed between the first sensor and the rear sensor;
   a display screen disposed in continuous uninterrupted view of the driver as the truck is entering the loading bay;
   a controller connected electronically to the first sensor, the rear sensor, the camera and the display screen;
   wherein the display screen is configured to display a pair of parallel stripes indicative of the detection of an object by the rear sensor within a predetermined distance from the rear sensor.

2. The system of claim 1, wherein the loading bay has a front, a rear, and the display screen is disposed at the front of the loading bay and the rear sensor is disposed at the rear of the loading bay.

3. The system of claim 1, wherein the first sensor is disposed between the display screen and the rear sensor.

4. The system of claim 1, wherein the field of view of the camera is aimed into the loading bay.

5. The system of claim 1, wherein the display screen is configured to display a graphical icon visible to the driver and indicative of the detection of an object by the first sensor within a predetermined distance from the first sensor.

6. The system of claim 1, wherein the each of the pair of parallel stripes elongates in a longitudinal direction and has a thickness dimension that is measured in a direction perpendicular to the longitudinal direction and indicative of the degree to which an object detected by the rear sensor varies from a predetermined tolerance distance from the rear sensor.

7. The system of claim 1, wherein the display screen is configured to display a streaming video recorded by the camera and superimposed on a graphical icon indicative of the desired location an object, wherein the streaming video and the graphical icon are visible to the driver.

8. The system of claim 1, wherein the rear sensor is spaced apart from the first sensor by a distance measured in the direction of the longitudinal axis.

9. The system of claim 1, wherein the camera is configured and disposed to provide to the controller, a live stream of images in the field of view of the camera.

10. The system of claim 9, wherein the controller is configured and disposed to provide to the display screen, a live stream of images in the field of view of the camera.

11. The system of claim 1, further comprising a front sensor, wherein the first sensor is disposed between the front sensor and the rear sensor.

* * * * *